(12) United States Patent
Turgis et al.

(10) Patent No.: US 7,589,131 B2
(45) Date of Patent: Sep. 15, 2009

(54) COMPOSITIONS FOR USE IN ENERGY CURABLE COMPOSITIONS

(75) Inventors: Jean-Dominique Turgis, Vertou (FR); Wojciech Wilczak, Jersey City, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 173 days.

(21) Appl. No.: 10/559,108

(22) PCT Filed: Oct. 17, 2003

(86) PCT No.: PCT/US03/33289

§ 371 (c)(1), (2), (4) Date: Dec. 2, 2005

(87) PCT Pub. No.: WO2004/036187

PCT Pub. Date: Apr. 29, 2004

(65) Prior Publication Data

US 2007/0100046 A1    May 3, 2007

(51) Int. Cl.
*C08F 2/46* (2006.01)
*C08K 5/09* (2006.01)
*C08K 5/098* (2006.01)
*C09D 191/00* (2006.01)

(52) U.S. Cl. .............. 522/81; 522/71; 522/74; 522/79; 522/83; 524/379; 524/386; 524/387; 524/388; 524/382; 106/243; 106/244; 106/268

(58) Field of Classification Search ............ 522/71, 522/81, 79, 83; 524/379, 386, 387, 388, 524/382; 106/243, 244, 268
See application file for complete search history.

(56) References Cited

U.S. PATENT DOCUMENTS

| | | | |
|---|---|---|---|
| 3,446,737 A | | 5/1969 | Panzer et al. |
| 4,544,694 A | * | 10/1985 | Bower ................. 524/385 |
| 4,618,553 A | | 10/1986 | Yuyama et al. |
| 4,676,836 A | | 6/1987 | Hill et al. |
| 5,077,317 A | | 12/1991 | Yi-Shyu et al. |
| 5,158,924 A | | 10/1992 | Konagaya et al. |
| 5,244,955 A | | 9/1993 | Toyoda et al. |
| 5,356,544 A | | 10/1994 | Zilberman et al. |
| 5,372,988 A | * | 12/1994 | Takeuchi et al. ........ 503/227 |
| 5,397,823 A | | 3/1995 | Torikoshi et al. |
| 6,808,770 B2 | * | 10/2004 | Nozawa et al. ....... 428/32.66 |
| 2002/0150735 A1 | * | 10/2002 | Nozawa et al. .......... 428/195 |

FOREIGN PATENT DOCUMENTS

| | | |
|---|---|---|
| EP | 0 072 176 A1 | 2/1983 |
| EP | 0 339 670 A2 | 11/1989 |
| EP | 0 736 812 A1 | 10/1996 |
| EP | 1 225 197 A2 | 7/2002 |
| JP | 57098236 A * | 6/1982 |

OTHER PUBLICATIONS

Product content—Polymer additives from Big Sun Chemical Coporation. [online], [retrieved on Sep. 17, 2008]. Retrieved from internet <URL: http://translate.google.com/translate?hl=en&sl=zh-TW&u=http://www.bigsunchem.com.tw/polymer%2520additives.htm&sa=X&oi=translate&resnum=6&ct=result&prev=/search%3Fq%3Datmer%2B129%26start%3D10%26hl%3Den%26sa%3DN>.*

* cited by examiner

*Primary Examiner*—Sanza L McClendon
(74) *Attorney, Agent, or Firm*—Dickstein, Shapiro, LLP.

(57) ABSTRACT

A composition comprised of a fatty acid metal salt and a fatty compound for use in an energy-curable coating having improved gloss and low coefficient of friction.

29 Claims, No Drawings

COMPOSITIONS FOR USE IN ENERGY CURABLE COMPOSITIONS

FIELD OF THE INVENTION

This invention relates to compositions for use in energy-curable coatings to improve gloss and lower the coefficient of friction of the coating composition.

BACKGROUND OF INVENTION

Energy-curable coating compositions, especially glossy coatings such as produced by crosslinking polymerization of monomers by actinic and non-actinic radiation (ultraviolet, electron beam, gamma, or microwave radiation) are used primarily for their ability to provide a protective layer with high gloss, typically above 85% (60° gloss) at 2 microns thickness. Numerous sectors of graphic arts, especially the packaging industry, require that in addition to coatings having high gloss, such coatings also must have a low coefficient of friction ("COF"), in the order of 0.3 and below, or a slide angle below 15°. The COF and slide angle are measured by placing two surfaces in contact with each other and measuring the ratio of the forces to start or continue movement of one surface onto the other.

Two major alternatives are known in the art to bring about low COF in energy-curable compositions. Soluble additives, such as silicone or fluorinated surfactants may reduce COF as well as dispersed solid or semi-solid materials, such as waxes. However, both of the additives have major disadvantages.

The most efficient coating additives are typically soluble in the coating mixture, therefore providing stable transparent coatings with the highest possible gloss. For example, in U.S. Pat. No. 4,886,551 alkoxylated silicones are disclosed as coating additives. While careful selection of silicones can actually improve gloss of base coating formulas and they may lower the coating's COF, they also exhibit major inconveniences such as migration into the package contents (food, juices, milk, etc), migration and then contamination of rollers and other areas of the printing press or unwanted areas of the print such as flaps, hot sealing areas, and others, and also not being re-writable nor gluable. As a result, silicones are undesirable in many industrial printing processes. It is also known in the art that non-migrating silicones are typically much less efficient in electron beam coatings than in ultra-violet ("UV") coatings to reduce COF. Even with excessive amounts of silicone, a plateau in COF is reached that cannot be overcome by further addition of surfactants.

In order to reach the lowest COF, waxes and silicones are often combined together. The waxes known in the art for such use are insoluble particulates of varying size and shape. They can be of animal origin (i.e. beeswax), vegetable (i.e. carnauba), synthetic ((i.e. polyolefins, PTFE) or derived from petroleum ((i.e. paraffins). Certain waxes also increase scuff resistance and other surface properties of coatings. The major drawback of all waxes is the dramatic impact on coating gloss. Typical waxes show a linear reduction in 60° gloss of about 10 points per percent used. Multiple attempts have been made by wax producers to overcome this feature through control of the wax shape, average particle size and breadth of distribution, and surface modifications, all leading to rather small effects. Compounding in a liquid carrier (energy curable or not) is today the most efficient way of obtaining some gloss retention with conventional wax products.

In paper web manufacturing and sizing, for example, one known alternative to common waxes are water-repellent insoluble metal salts of fatty acids. Such salts are obtained from the reaction of a fatty acid preferably selected from a group of stearic, oleic, linoleic, or palmitic acids, combined with a metal that is a member of Group I, II or III on the periodic table. For example, fatty acid derivatives are described as adequate dispersants for PTFE in non-aqueous systems, such as petroleum distillates and solvent-based and powder coatings. U.S. Pat. Nos. 5,863,875 and 6,066,601 for instance, describe lubricant compositions (concentrates) containing in a suitable solvent the combination of fatty amides which are made with multifunctional amines and monoacids in order to obtain non-crosslinked amide, and at least one fluoropolymer.

The use of waxes in combination with a hydrocarbyl succinamic acid or amine or ammonium salt thereof has been described in GB 1,465,175 as useful for improving the low temperature flowability of petroleum middle distillate fuels but no mention is made in this field of the effect of such compounds on the tribology of such oils.

Multiple patents describe aqueous lubricant dispersions containing calcium stearate and a fatty acid-derived lubricant component, either non-ionic such as polyethylene glycol mono-esters of fatty acids (U.S. Pat. No. 2,425,828), ethylene oxide adducts of fatty amides, sorbitan esters of fatty acids, ethylene oxide and propylene oxide adducts of sorbitan esters of fatty acids, lower alkyl mono ethers of polyethylene glycol mono esters of fatty acids (U.S. Pat. No. 4,659,589), or anionic such as water-soluble ammonium, substituted ammonium or alkali metal salt of sulfated fatty acid and esters, fatty acid soaps, and sulfated glycerides of unsaturated fatty acids (U.S. Pat. No. 4,676,836). Exhaustive references to the existing art can be found in U.S. Pat. No. 5,527,383. In U.S. Pat. No. 5,356,544, stearic acid salts with alkali metal oxide or hydroxide including ammonia produced in-situ are put in presence of calcium oxide, forming a water dispersion of calcium stearate with controlled particle size and without any other surfactant. However, none of these materials are described to be used outside of water-based paper sizing compositions.

Alternates to calcium stearate are also described, using fatty acids and derivatives as a dispersed phase. In U.S. Pat. No. 4,766,015 a lubricant for paper coatings is described comprising a fatty acid, a surfactant and a crude lecithin component as the dispersed phase. In U.S. Pat. No. 5,858,933, surfactantless compositions are described, using fatty esters instead of acids, providing superior lubrication during the paper coating application. These lubricant compositions are again described as merely being dispersable in water or water-based paper coating compositions.

Thus, there exists a need for a wax-free composition for use in energy-curable coating compositions to reduce the COF while still maintaining and improving gloss of the coating.

SUMMARY OF INVENTION

It has now been found that the above objectives of lowering the COF of an energy-curable coating composition and improving the gloss of the coating can be realized by employing a composition comprised of a fatty acid metal salt and a fatty compound.

Other objects and advantages of the present invention will become apparent from the following description and appended claims.

DETAILED DESCRIPTION

The invention discloses a composition comprising mixtures of fatty acid metal salts and a medium melting point fatty derivative. The fatty derivative compound may be a fatty acid, fatty alcohol, fatty acid ester, fatty alcohol ester, fatty amide, fatty acid amine salt or combinations thereof. The composition may be incorporated into an energy-curable coating either directly or pro dispersed in a suitable vehicle to provide the coating with surface slip properties and increased gloss.

The fatty acid metal salt of the present invention may be any Group I, II or III metal salts, preferably aluminum, barium, calcium, lithium, magnesium and/or zinc. It is preferred that the fatty acid metal salt be calcium stearate. Calcium stearate is a very economical and a practical choice but has only been used in water-based paper-sizing compositions and cosmetics as a lubricant only.

Depending upon the grade of stearic acid used in the preparation of the calcium stearate, there will be present other fatty materials such as palmitic and oleic acid. Thus, the term calcium stearate covers calcium stearate as well as calcium stearate containing varying amounts of calcium palmitate, calcium oleate and other materials.

Many grades of calcium stearate are available that have various compositions as well as different particle size characteristics. In the scope of the present invention, the preferred particle size for the fatty acid metal salt used, regardless of its nature, is obtained when a substantial proportion of the distribution lies above the thickness of the cured coating. For example, if the coating film thickness is about 10 microns, the particle size of the fatty acid metal salt should also be about 10 microns so that a substantial portion of the distribution lies above the thickness of the film. One of the mechanisms by which low COF is obtained is that particles disrupt the coating surface, thus reducing the surface area in contact between sliding pieces. While all tested fatty acid metal salts are enhanced by their association with fatty acids, the best results are obtained through proper selection of the starting fatty acid metal salt.

The fatty compound should have a melting point of above 50° C., with a preferred melting point of between 50° C. to about 150° C. The fatty compound may be a fatty acid, fatty alcohol, fatty acid ester, fatty alcohol ester, fatty amide, fatty acid amine salt or combinations thereof.

The fatty acids may be, but are not restricted to, arachidic, behenic, capric, caproic, caprylic, cholic, erucic, lauric, lignoceric, linoleic, linolenic, myristic, palmitic, pelargonic, oleic, olitic, ricinoleic, stearic acid, and acids from natural oils, such as coconut oil, tall oil, and the like. The fatty acids may have between 10 and 30 carbon atoms in their main chain, and are preferably solid at room temperature. In a preferred embodiment, the fatty acid is saturated, contains between 12 and 20 carbon atoms and has a melting point above 50° C. It is preferred that if the fatty compound is a fatty acid that it be stearic acid.

The fatty alcohols may be, but are not restricted to, the alcohols corresponding to the acids cited above.

The fatty acid esters may be, but are not limited to, the reaction products of any of the acids described above with an alcohol, or any of the alcohols described above with and acid, or the reaction product of the acids described above and the alcohols described above.

The fatty alcohol esters may also contain acid groups and long alkyl chains such as certain adducts of styrene maleic anhydride polymers with monoalcohols of linear low molecular weight ethylene homo- and co-polymers or fatty alcohols. Such products are, for instance, marketed by Baker Petrolyte under the trade name Ceramer® as wax dispersants. They are waxy solids at room temperature and as such can be incorporated in acrylated monomers and put in the presence of solid lubricants using the method disclosed in the present invention.

The fatty amides may be, but are not restricted to, primary amides like stearamide, oleamide, erucamide, secondary amides like stearyl stearamide, stearyl erucamide, bis amides (saturated & unsaturated) like ethylene bis stearamide, ethylene bis oleamide, alkanolamides like: coco monoethanolamide, coco diethanolamide, oleic diethanolamide, lauric diethanolamide, and stearic diethanolamide. The fatty amides may be a combination of fatty acids with amines, acid with fatty amines, or both fatty acids and fatty amines.

The amines used to create salts with fatty acids are preferably tertiary amines since primary and secondary amines readily react with acrylic double-bonds to form adducts, thus affecting the storage stability of the coating. Simple amines such as methyl diethanolamine, when combined with stearic acid and a fatty acid metal salt enhance COF to an appreciable extent. Acrylated amines used as co-initiators in energy-curable compositions are another category of tertiary amines that can be used. They are typically obtained from the Michael addition of monofunctional secondary amines and multifunctional acrylate monomers. As such, they are composed of a mixture of mono, di and multifunctional amines. In addition to enhancing COF properties when combined with fatty acids using the described method, these amines act as a co-initiator in UV-initiated polymerization. Fatty amines may also be used to create salts with regular acids or fatty acids. Salts made with fatty amines are especially suitable for the present invention. In addition, polyamines typically recommended for dispersing organic and inorganic pigments may also be used in the present invention. When combined with fatty acids, they offer the double benefit of reducing the COF and of stabilizing the coating made from the dispersion against floating or settling of the dispersed phase (inorganic or organic, wax, fatty acid metal salt, or pigment). The preferred amount of such polyamine salts is small, typically in ratios 1:40 up to 1:10 to solid lubricant. In a more preferred embodiment, a combination of amine compounds is used to combine the benefits brought by each class as required by the specific intended use of the coating. The recommended amount of fatty acid used to neutralize the amine is calculated so that the amine value of the amine is between 30% and 100% of the acid value of the fatty acid.

The fatty amines are typically produced by reaction of a fatty alcohol and dimethylamine. As such, they contain the same moieties as the fatty alcohols described above.

The fatty acid metal salt is generally about 1-50% of the dispersion and the fatty compound is generally about 50-99% of the dispersion. The preferred ratio of fatty acid metal salt to fatty compound is from about 40:1 to about 2:1, more preferred of from about 20:1 to about 4:1.

The combined concentration of the fatty acid metal salt and the fatty compound in the energy-curable coating composition is from about 0.01% to about 10%, more preferably from about 0.3% to about 7%, and most preferably from about 0.5% to about 4%.

A dispersion may be formulated by combining the fatty compound in powder form, separately obtained by any manner known, including but not limited to dry milling or grinding or other techniques used to produce finely dispersed powders, into a dispersing vehicle. The dispersion of the fatty compound may also be prepared such that the fatty compound is generated in-situ, by heating a liquid dispersing vehicle above the melting point of the fatty compound to form a hot blend, to which the fatty acid metal salt is added. Upon cooling, the molten material having low solubility in the dispersing vehicle absorbs onto the fatty acid metal salt, generating the fatty compound in-situ. The resulting dispersed compound may be further ground in presence of the dispersing vehicle by any method known to reduce particle size further if necessary. If the fatty compound is available in powder form, preparation of a dispersion is optional, and the powder may be used directly in final coating compositions.

The dispersion or solid compound of the present invention is incorporated into energy curable coatings by simple mixing of the required ingredients at ambient temperature. UV formulas may require a photoinitiator to cure. In some cases, the photoinitiator is a blend containing amine co-initiators. These amines may be reactive and cure along with the rest of the composition. Such amines can either be used in the preparation of the present dispersions as described above or added to the finished coating without disturbing the slip enhancing mechanism. Additional additives may also be incorporated into the coating such as surfactants, leveling agents, slip agents, defoamers and the like.

According to the most preferred embodiment, the dispersion is comprised of a powdered fatty acid metal salt, which is calcium stearate, and a fatty acid, which is stearic acid.

The coating containing the dispersion of the present invention results in a coating having much better properties than conventional wax dispersion coatings. A coating containing the dispersion of the present invention exhibits low COF and high gloss, as well as being rewriteable while exhibiting superior gloss to the same coatings containing waxes, thus providing a viable alternative to silicone additives. Considerable reduction of the COF may be obtained at equal gloss. At a slide angle of 10° or a static COF of 0.25, the gloss difference between wax-containing coatings and the coatings formulated with the compounds described in the present invention is 25 points. The coatings may achieve as low as 2 points gloss drop per percent dry fatty compound used.

The dispersions of the present invention are further illustrated by the following non-limiting examples in which all parts and percentages are by weight or grams, unless otherwise indicated.

EXAMPLE 1

A composition was prepared by adding stearic acid (2.5 grams, Mw=256.4) to trimethylolpropane triacrylate (37.5 grams) at a temperature sufficient to melt the fatty acid crystals. In absence of calcium stearate, the fatty acid precipitated upon cooling to form non-spherical crystals. Addition of calcium stearate (10 grams) to the hot, clear mixture was made under agitation. Cooling resulted in a milky dispersion free of crystals.

EXAMPLE 2

A composition was prepared by adding stearic acid (Mw=284.5; 1.9 grams) to trimethylolpropane triacrylate (50.8 g) at a temperature sufficient to melt the fatty acid crystals. A stoichiometric amount of methyl diethanol amine was added to the hot blend (0.80 g) such that an exotherm was observed indicating the neutralization reaction forming a salt between the acid group of the fatty acid and the amine was taking place. Upon cooling, the salt precipitated to an amorphous gel-like compound producing a waxy material swelled with monomer. Calcium stearate (50.8 grams) was added under agitation producing a milky dispersion which remained fluid upon cooling.

The fatty acid amine salt had a weight ratio of 27% and the total amount of lubricant in the dispersion was 25%.

EXAMPLE 3

Two coatings were formulated as set forth in Table 1 below. Both coatings were coated with a 600 lines flexo proofer on polycoated board and cured at 2 Mrad with electron beam and tested right away for gloss and coefficient of friction. The COF friction was tested by sliding two coated surfaces against each other in a face-to-face configuration using a flat-bed COF tester, Testing Machines Inc., model 32-06.

TABLE 1

|  | Composition | |
| --- | --- | --- |
|  | Example 3-A | Example 3-B |
| Example 2 Dispersion | — | 16.00 |
| Calcium Stearate | 4.00 | — |
| TMPTA | 12.00 | — |
| Epoxydiacrylate | 20.00 | 20.00 |
| Ethoxylated TMPTA | 63.45 | 63.45 |
| Levelling agent | 0.50 | 0.50 |
| Defoamer | 0.05 | 0.05 |
| Gloss (60°) | 63 | 64 |
| Static COF | 0.45 | 0.25 |

The coating incorporating the dispersion of the present invention resulted in a dramatic reduction of the COF with a slight gain in gloss when compared to a coating containing the same weight fraction of the powdered fatty acid metal salt alone.

EXAMPLE 4

A composition was prepared by adding stearic acid (Mw=284.5; 1.9 grams) to trimethylolpropane triacrylate (50.8 grams) at temperature sufficient to melt the fatty acid crystals. Zinc stearate (10 grams; Coad 27B, available from Norac of Azusa, Calif.) was added under agitation producing a milky dispersion.

EXAMPLE 5

Two coatings were formulated as set forth in Table 2 below. Both coatings were coated with a 600 lines flexo proofer on polycoated board and cured at 2 Mrad with electron beam and tested right away for gloss and coefficient of friction. The COF was tested by the process as set forth in Example 3.

TABLE 2

|  | Composition | |
| --- | --- | --- |
|  | Example 5-A | Example 5-B |
| Example 4 Dispersion | — | 16.00 |
| Zinc Stearate | 4.00 | — |
| TMPTA | 12.00 | — |
| Epoxydiacrylate | 20.00 | 20.00 |
| Ethoxylated TMPTA | 63.45 | 63.45 |
| Levelling agent | 0.50 | 0.50 |
| Defoamer | 0.05 | 0.05 |
| Gloss (60°) | 59 | 61 |
| Static COF | 0.37 | 0.31 |

The dispersion of the present invention incorporating a fatty acid derivative (stearic acid) in conjunction with the powdered fatty acid metal salt (zinc stearate) resulted in a coating having a reduced COF with a slight gain in gloss when compared to a coating containing the same weight fraction of the powdered fatty acid metal salt alone.

EXAMPLE 6

A composition was prepared by adding stearic acid (Mw=284.5; 1.9 grams) to trimethylolpropane triacrylate (50.8 grams) at a temperature sufficient to melt the fatty acid crystals. Calcium stearate (10 grams; Norac 10B available from NORAC of Azusa, Calif.) was added under agitation, producing a milky dispersion.

EXAMPLE 7

Two coatings were formulated as set forth in Table 3 below. Both coatings were coated with a 600 lines flexo proofer on polycoated board and cured at 2 Mrad with electron beam and tested right away for gloss and coefficient of friction. The COF was tested by the process as set forth in Example 3.

TABLE 4

| | Composition | |
|---|---|---|
| | Example 7-A | Example 7-B |
| Example 6 Dispersion | — | 16.00 |
| Calcium Stearate | 4.00 | — |
| TMPTA | 12.00 | — |
| Epoxydiacrylate | 20.00 | 20.00 |
| Ethoxylated TMPTA | 63.45 | 63.45 |
| Levelling agent | 0.50 | 0.50 |
| Defoamer | 0.05 | 0.05 |
| Gloss (60°) | 62 | 64 |
| Static COF | 0.45 | 0.29 |

The coating containing the dispersion of the present invention resulted in a reduction of the COF with a slight gain in gloss when compared to a coating containing the same weight fraction of the powdered fatty acid metal salt alone.

EXAMPLE 8

A stearic acid ester amide was prepared by adding diethanolamine (0.22 mole; 23.1 grams) to stearic acid (0.638 mole; 173.2 grams) over 30 minutes at 90° C. Nitrogen was purged through at 2.8 L/hr and the reaction mixture heated to 150° C. in 0.8 of an hour, and then to 170° C. in a half hour. The reaction mixture was held at 170° C. for 2 hours and then heated to 205° C. for 15 minutes. 10 ml of water was removed and the reaction mixture was held at 205-209° C. for 2 hours and forty five minutes resulting in an aid neutralization number (NNA) of 13.7. The reaction mixture was further heated at 210° C. for 4 hours and then filtered at 110° C. using a filter aid (13 grams). The filtrate was collected as the product and on cooling, the material solidified at about 53° C.

A dispersion was prepared by adding stearic acid ester amide described (1.5 grams) to trimethylolpropane triacrylate (38.5 grams) at a temperature sufficient to melt the fatty acid ester amide crystals. Calcium stearate (10 grams; Norac 10B available from NORAC of Azusa, Calif.) was added under agitation producing a milky dispersion which remained fluid upon cooling.

EXAMPLE 9

Two coatings were formulated as set forth in Table 4 below. Both coatings were coated with a 600 lines flexo proofer on polycoated board and cured at 2 Mrad with electronbeam and tested right away for gloss and coefficient of friction. The COF was tested by the process as set forth in Example 3.

TABLE 4

| | Composition | |
|---|---|---|
| | Example 9-A | Example 9-B |
| Example 8 Dispersion | — | 16.00 |
| Calcium Stearate | 4.00 | — |
| TMPTA | 12.00 | — |
| Epoxydiacrylate | 20.00 | 20.00 |
| Ethoxylated TMPTA | 63.45 | 63.45 |
| Levelling agent | 0.50 | 0.50 |
| Defoamer | 0.05 | 0.05 |
| Gloss (60°) | 62 | 64 |
| Static COF | 0.45 | 0.377 |

The dispersion containing the fatty acid derivative (stearic acid ester amide) with the powdered fatty acid metal salt (calcium stearate) incorporated into a coating resulted in a coating having reduced COF with a slight gain in gloss when compared to a coating containing the same weight fraction of the powdered fatty acid metal salt alone.

The invention has been described in terms of preferred embodiments thereof, but is more broadly applicable as will be understood by those skilled in the art. The scope of the invention is only limited by the following claims.

What is claimed:

1. A dispersion comprising: (a) a fatty acid metal salt; and (b) a fatty compound selected from the group consisting of fatty acids, fatty alcohols, fatty acid esters, fatty alcohol esters, fatty amides, fatty amines, fatty acid amine salts and combinations thereof, wherein the combination of the fatty acid metal salt and fatty compound contains between about 1 to about 50% by weight fatty acid metal salt and about 50 to about 99% by weight fatty acid compound.

2. The dispersion of claim 1 wherein the fatty acid metal salt is selected from the group consisting of salts of aluminum, barium, calcium, lithium, magnesium and zinc.

3. The dispersion of claim 1 wherein the fatty acid metal salt is calcium stearate.

4. The dispersion of claim 1 wherein the fatty compound contains between 10 to 30 carbon atoms.

5. The dispersion of claim 1 wherein the fatty compound contains between 12 to 20 carbon atoms.

6. The dispersion of claim 1 wherein the fatty compound is solid at room temperature.

7. The dispersion of claim 1 wherein the fatty compound has a melting point above 50 C.

8. The dispersion of claim 1 wherein the fatty acid is selected from the group consisting of arachidic acid, behenic acid, capric acid, caproic acid, caprylic acid, cholic acid, erucic acid, lauric acid, lignoceric acid, linoleic acid, linolenic acid, myristic acid, palmitic acid, pelargonic acid, oleic acid, olitic acid, ricinoleic acid, stearic acid, acids from natural oils, acids from coconut oil, acids from tall oil, and combinations thereof.

9. The dispersion of claim 8 wherein the fatty compound is steric acid.

10. The dispersion of claim 1 wherein the fatty compound is neutralized by an amine.

11. The dispersion of claim 10 wherein the amine value of the amine is between 30% and 100% of the acid value of the fatty acid.

12. An energy-curable coating composition comprised of a dispersion comprising: (a) a fatty acid metal salt; and (b) a fatty compound selected from the group consisting of fatty acids, fatty alcohols, fatty acid esters, fatty alcohol esters, fatty amides, fatty amines, fatty acid amine salts and combinations thereof and wherein the fatty acid metal salt and fatty compound are in respective amounts of between about 1 to about 50% by weight and about 50 to 99% by weight.

13. The energy-curable coating composition of claim 12 wherein the coating has increased gloss and reduced coefficient of friction.

14. The energy-curable coating composition of claim 13 wherein the coating has a gloss of above 40 and a coefficient of friction of less than 2.

15. A method for improving gloss and reducing the coefficient of friction of an energy-curable coating composition comprising combining the energy-curable coating composition with a dispersion comprising: (a) a fatty acid metal salt; and (b) a fatty compound selected from the group consisting of fatty acids, fatty alcohols, fatty acid esters, fatty alcohol esters, fatty amides, fatty amines, and fatty acid amine salts and combinations thereof.

16. The method of claim 15 wherein the fatty acid metal salt is selected from the group consisting of salts of aluminum, barium, calcium, lithium, magnesium and zinc.

17. The method of claim 15 wherein the fatty acid metal salt is calcium stearate.

18. The method of claim 15 wherein the fatty acid metal salt and fatty compound are present in respective amounts of between about 1 to about 50% by weight and about 50 to 99% by weight.

19. The method of claim 15 wherein the fatty compound contains between 10 to 30 carbon atoms.

20. The method of claim 15 wherein the fatty compound contains between 12 to 20 carbon atoms.

21. The method of claim 15 wherein the fatty compound is solid at room temperature.

22. The method of claim 15 wherein the fatty compound has a melting point above 50 C.

23. The method of claim 15 wherein the fatty acid is selected from the group consisting of arachidic acid, behenic acid, capric acid, caproic acid, caprylic acid, cholic acid, erucic acid, lauric acid, lignoceric acid, linoleic acid, linolenic acid, myristic acid, palmitic acid, pelargonic acid, oleic acid, olitic acid, ricinoleic acid, stearic acid, acids from natural oils, acids from coconut oil, acids from tall oil, and combinations thereof.

24. The method of claim 23 wherein the fatty acid is steric acid.

25. The method of claim 15 wherein the fatty compound is neutralized by an amine.

26. The method of claim 25 wherein the amine value of the amine is between 30% an 100% of the acid value of the fatty acid.

27. A method of preparing a dispersion for use in an energy-curable composition wherein the dispersion lowers the coefficient of friction of the coating and improves gloss, comprising the steps of: (a) combining a fatty compound, selected from the group consisting of fatty acids, fatty alcohols, fatty acid esters, fatty alcohol esters, fatty amides, fatty amines, fatty acid amine salts and combinations thereof, into a dispersing vehicle at a temperature sufficient to melt the fatty compound; (b) adding a fatty acid metal salt; and (c) cooling the reaction mixture, wherein the fatty acid metal salt and fatty compound are in respective amounts of between about 1 to about 50% by weight and about 50 to 99% by weight.

28. The method of claim 27 further comprising the step of grinding the dispersion.

29. A method of preparing an energy-curable coating having low coefficient of friction of the coating and improved gloss, comprising the steps of: (a) preparing a dispersion comprising the steps of (i) combining a fatty compound, selected from the group consisting of fatty acids, fatty alcohols, fatty acid esters, fatty alcohol esters, fatty amides, fatty amines, fatty acid amine salts and combinations thereof, into a dispersing vehicle at a temperature sufficient to melt the fatty compound, (ii) adding a fatty acid metal salt, and (iii) cooling the reaction mixture; and (b) mixing the dispersion with photoinitiators; and (c) mixing with resin.

* * * * *

UNITED STATES PATENT AND TRADEMARK OFFICE
CERTIFICATE OF CORRECTION

| | | |
|---|---|---|
| PATENT NO. | : 7,589,131 B2 | Page 1 of 1 |
| APPLICATION NO. | : 10/559108 | |
| DATED | : September 15, 2009 | |
| INVENTOR(S) | : Turgis et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 304 days.

Signed and Sealed this

Twenty-first Day of September, 2010

David J. Kappos
*Director of the United States Patent and Trademark Office*